Figure 1:
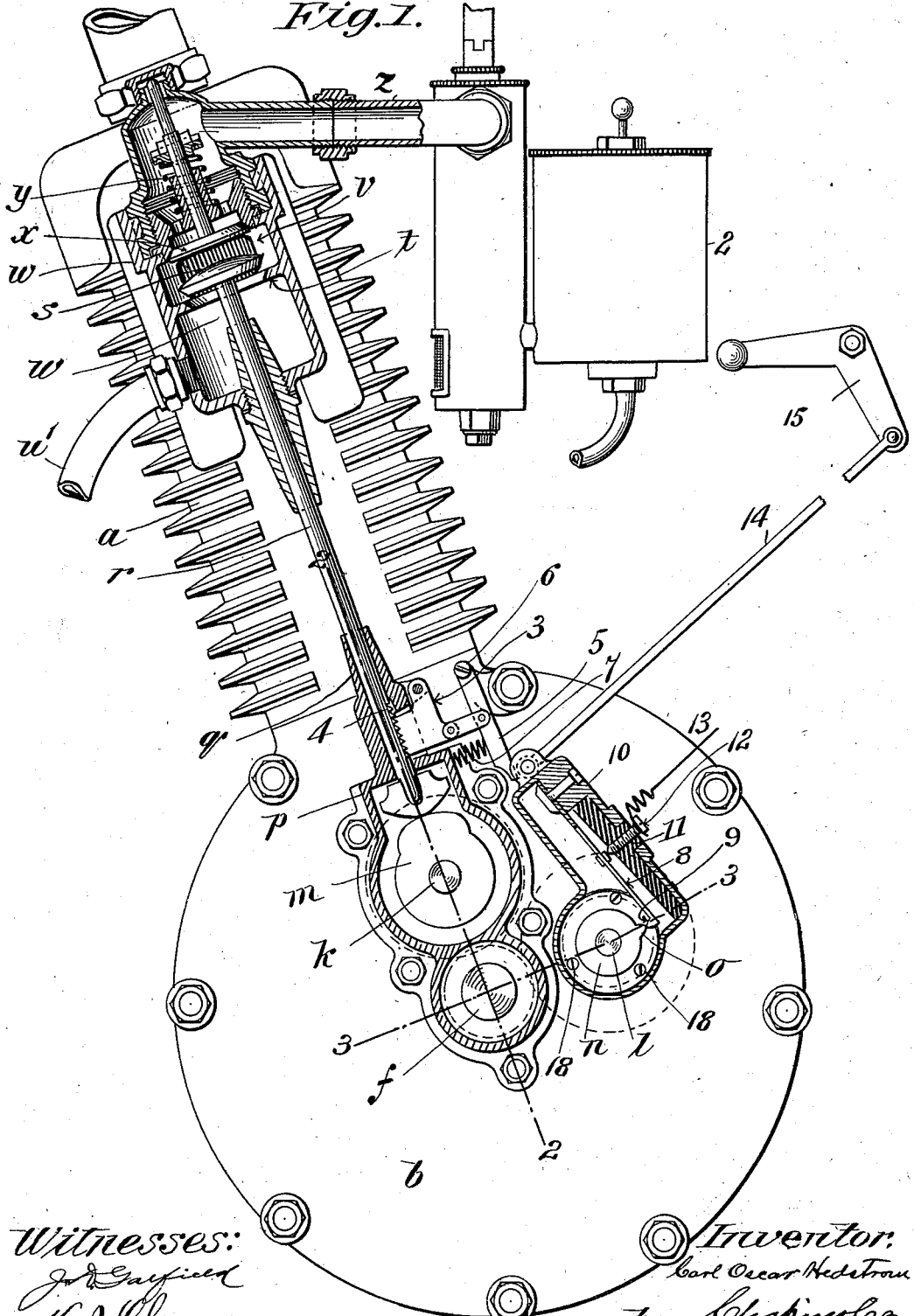

No. 727,944. PATENTED MAY 12, 1903.
C. O. HEDSTROM.
CONTROLLING MECHANISM FOR INTERNAL COMBUSTION ENGINES.
APPLICATION FILED OCT. 28, 1901.

NO MODEL. 2 SHEETS—SHEET 1.

Witnesses:
Inventor:
Carl Oscar Hedstrom
by Chapin & Lee
Attorneys

No. 727,944. PATENTED MAY 12, 1903.
C. O. HEDSTROM.
CONTROLLING MECHANISM FOR INTERNAL COMBUSTION ENGINES.
APPLICATION FILED OCT. 28, 1901.
NO MODEL. 2 SHEETS—SHEET 2.
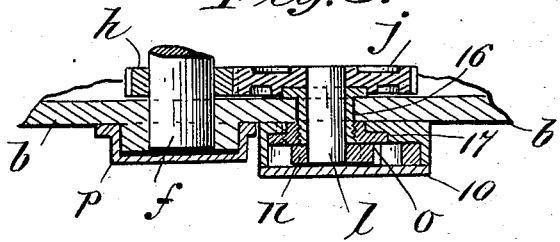
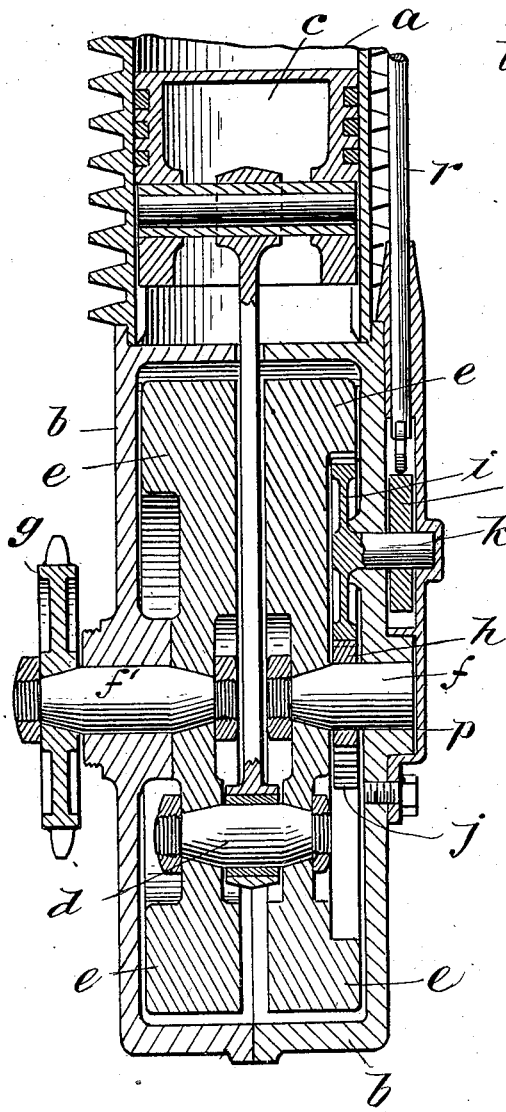
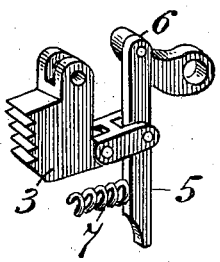
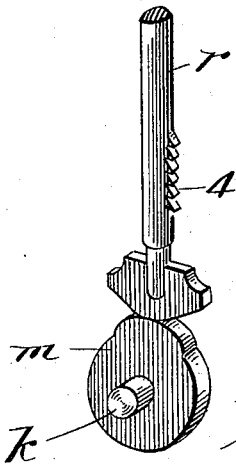

No. 727,944. Patented May 12, 1903.

UNITED STATES PATENT OFFICE.

CARL O. HEDSTROM, OF PORTLAND, CONNECTICUT, ASSIGNOR TO GEORGE M. HENDEE, OF SPRINGFIELD, MASSACHUSETTS.

CONTROLLING MECHANISM FOR INTERNAL-COMBUSTION ENGINES.

SPECIFICATION forming part of Letters Patent No. 727,944, dated May 12, 1903.

Application filed October 28, 1901. Serial No. 80,194. (No model.)

*To all whom it may concern:*

Be it known that I, CARL OSCAR HEDSTROM, a citizen of the United States of America, residing at Portland, in the county of Middlesex and State of Connecticut, have invented new and useful Improvements in Controlling Mechanism for Internal-Combustion Engines, of which the following is a specification.

This invention relates to the construction of internal-combustion engines, and has for its object the improvement in means for controlling motors of this class by a variation of the time of the explosion relative to the position of the piston within the cylinder and the improvement in means for rendering the motor inactive.

The invention consists, essentially, in the construction of means whereby the power of the motor is gradually reduced to a minimum by the variation in the time of sparking and in devices operated by the same means, whereby the operations of the valve are interrupted after the power has been reduced to as low a point as possible by changing the time of explosion.

A further object of the invention lies in the construction of these controlling devices whereby their transverse dimensions may be reduced to as small a compass as possible, to the end that the "tread" of the machine may be brought down to within as narrow limits as possible.

In the drawings forming part of this application, Figure 1 is a side elevation of an internal-combustion engine constructed according to my invention, certain of the parts of the engine being shown in section. Fig. 2 is a vertical sectional view on line 2 2, Fig. 1, through the crank-casing and a portion of the cylinder. Fig. 3 is a section through the wall of the crank-casing on line 3 3, Fig. 1. Fig. 4 is a perspective view of a spring-operated latch engaging the valve-stem of the motor. Fig. 5 is a perspective view of the lower end of the valve-stem and its actuating-cam.

Referring to the drawings, $a$ indicates an open-ended cylinder of a motor having the closed crank-casing $b$ secured to said open end thereof. The piston $c$ is connected directly with a wrist-pin $d$, which, eccentrically located, serves as a means of connection between two balance-wheels $e$, each hung on studs $f\ f'$, having a bearing in the casing, and one of said studs $f'$ projecting through the casing and having on its outer end a sprocket-wheel $g$, whereby through suitable connections power is applied to drive the vehicle on which the motor is mounted.

All of the foregoing construction is well known and forms no part of this invention.

On the stud $f$, inside of the casing and within a recess turned in the side of the balance-wheel, there is mounted a gear $h$, which meshes with two other gears $i$ and $j$, mounted on studs $k$ and $l$, respectively, having a bearing in the casing. These two gears $i$ and $j$ (also located in said recess in the side of the balance-wheel) are of such proportion relative to the gear $h$ that they rotate once to the latter's twice.

On the stud $k$, outside of the casing, there is secured a cam $m$. On the stud $l$ there is secured, outside of the casing, a hub $n$, having a spur $o$ thereon, whereby the operation of the sparking device is effected.

It is not new to operate a valve of an internal-combustion engine and a sparking device therefor by means of suitable separate gear connections with the crank-shaft of the motor; but it is believed to be new to construct them, as I have shown therein, by locating the gears on the inside of the crank-casing within an annular recess in the side of the balance-wheel, whereby I am enabled to narrow the tread of the machine to a very considerable extent, with the added advantage of running the gears within the closed casing, whereby they are entirely protected from grit and dust.

The end of the stud $f$ and the stud $k$, which bears the cam $m$, are entirely covered by a metal cap $p$, having at its upper end a sleeve $q$, which serves as a bearing for the valve-stem $r$, carrying the valve $s$ at its upper end. This valve serves to open and close a passage in the partition $t$ between the chamber $u$, with which the exhaust-pipe $u'$ connects, and the valve-chamber $v$, located within a cylindrical valve-casing $w$. (Shown only in Fig. 1.) From the chamber $v$ the usual port leads into the cylinder of the motor, a valve $x$ governing the admission of the explosive mixture and opening under the suction effect of the piston when the valve $s$ is closed. Of course when the latter valve is open, as shown in Fig. 1, the valve $x$ would remain closed by being held to its seat by its spring $y$ and air only would be drawn in by the continued movement of the piston through the exhaust-pipe $u'$ and again expelled therethrough on the return stroke, the supply of explosive mixture to the motor being thus cut off when the valve $s$ is held off from its seat. The upper part of the valve-body $w$ communicates through the pipe $z$ with the carbureting apparatus 2. On one side of the sleeve $q$ there is pivotally supported a latch 3, having a serrated edge which engages with serrations 4 on the valve-stem $r$, the said latch lying partly within a slot in said sleeve $q$. The lower end of the latch is connected by a link to a lever 5, pivotally supported on a screw 6 by its upper end, its lower end extending some distance below the link connection between it and said latch, and a spring 7 is located between said downwardly-extending end and the side of the metal cap $p$, whereby normally the latch 3 is held out of engagement with the serrations 4. Therefore under normal conditions the valve $s$ will be periodically operated by the rotation of the cam $m$ unobstructed by any interference of the latch 3 therewith; but during the operations of the sparking device for reducing the power of the motor (which devices will be described farther on) the latch 3 is caused at a certain point to swing toward and to obstruct the descent of the valve-stem $r$, whereby the latter may be held open, although there is no obstruction interposed to the upward movement of said valve-stem, and it follows, therefore, that the latch may be swung into engaging position with the valve-stem regardless of the position of the latter at the time.

The sparking device, while not new in principle of operation, is believed to be new in its present construction and combination with other parts of the motor, as will hereinafter appear. This sparking device comprises a spring-finger 8, (shown only in Fig. 1,) which has a lip or projection 9 on the lower end thereof, with which the spur $o$ on the hub $n$ comes in contact once during the revolution of said hub. This finger 8 is supported by one end in a casing 10, constructed to oscillate about the axis of the stud $l$, on which said hub $n$ is fixed. In said casing is a piece of insulating material 11, through which a metal post in the form of a screw 12 passes, against the end of which the finger 8 comes in contact when the spur $o$ operates it. With said screw 12 there is connected a wire 13, leading to one pole of a battery, (not shown herein,) the opposite pole of said battery being, as usual, connected with some part of the machine, to the end that when the spur $o$ on the hub $n$ operates the finger 8 to make a contact with the screw 12 said finger serves as a bridge for the current between two ends of a circuit. The passing of the spur $o$ by the end of the finger 8 breaks this circuit and produces the igniting-spark in the cylinder, as usual. This casing 10 above referred to is movable about the axis of the stud $l$ by means of a connecting-rod 14, extending from the top of said casing to one arm of an elbow-lever 15, which is located on the motor-cycle at some point convenient to the hand of the rider that is generally near the handle-bar. As this casing by means of said elbow-lever and connection 14 is swung toward the stud $k$ the time of the contact of the spur $o$ with the finger 8 will be gradually retarded relative to the position of the piston within the cylinder until such time as when this contact takes place the piston shall have reached nearly or quite the limit of its compression-stroke, whereby the efficiency of the motor will be reduced to its minimum.

If now a further movement be imparted to the casing 10 in the same direction, the latter will strike the lower end of the lever 5 and the latch 3 be thereby swung into position of engagement with the serrations on the valve-stem $r$. The latter, as heretofore stated, will rise past the serrated edge of this latch, but is prevented from returning, and is thereby retained in that position in which the cam $m$ will leave it at the limit of the upward thrust of the latter, the valve $s$ on the end of the stem being thereby held off from its seat, as stated.

It is obvious that the casing 10 must in its oscillations about the stud $l$ not interfere with the rotation of said stud and its hub $n$, and to that end this stud is given a bearing in a bushing 16, which passes through the casing $b$ and has screwed onto its outer end a nut having a flange 17 thereon. The back wall of the casing 10 has a hole therein into which this nut may be introduced when it is screwed onto the end of the bushing 16, the flange 17 on said nut being received in a countersunk annular recess in the rear wall of said casing, all as clearly shown in said Fig. 3, and the parts being assembled the screws 18 (best shown in Fig. 1) are then passed through said flange 17 into the back wall of the casing 10, thus securing these parts together. By this arrangement of course when the casing 10 is oscillated on its axes the nut will turn on the end of the bushing 16; but this movement is so slight that it does not result in the loosening of the parts to any practical extent. The hub $n$ may be secured on the end of the stud $l$ by a key or otherwise. This hub and the gear $j$, both being secured to said stud, constitute practically the collars for holding the latter in its proper position, the same function being performed for the stud $k$ by the gear $i$ and the cam $m$. It is thus seen that provision is made in this construction for the gradual reduction of the speed of the motor prior to the actual cutting off of the introduction of explosive mixture thereto and that when this mixture is again allowed to enter the time of sparking will take place at a point which permits the motor to resume its function when it is reduced to its minimum efficiency, and the machine for these reasons is not subjected to any severe strains in starting.

By mounting the sparking device in the manner herein described on the outside of the casing $b$ it is easily removable for the purpose of cleaning its contact-points.

Having thus described my invention, what I claim, and desire to secure by Letters Patent of the United States, is—

In an internal-combustion engine, a controlling-valve and means for periodically opening and closing said valve; a latch having a swinging movement toward and from the stem of said valve, teeth on the valve-stem, and teeth on said latch to engage therewith; an adjustable sparking device, and connections between the latter and said latch to move the latter into and out of engaging position with said valve-stem.

CARL O. HEDSTROM.

Witnesses:
K. I. CLEMONS,
WM. H. CHAPIN.